(12) United States Patent
Craig, Jr.

(10) Patent No.: US 6,457,212 B1
(45) Date of Patent: Oct. 1, 2002

(54) METHOD OF MAKING HOSE CLAMPS WITH INTERNAL CLAMPING SURFACES DEVOID OF STEPS OR GAPS AND PRODUCTS MADE BY SUCH METHOD

(75) Inventor: Paul M. Craig, Jr., Silver Spring, MD (US)

(73) Assignee: Hans Oetiker AG Maschinen- und Apparatefabrik, Horgen (CH)

( * ) Notice: Subject to any disclaimer, the term of this patent is extended or adjusted under 35 U.S.C. 154(b) by 0 days.

(21) Appl. No.: 10/026,715

(22) Filed: Dec. 27, 2001

Related U.S. Application Data (60) Provisional application No. 60/266,849, filed on Feb. 7, 2001.

(51) Int. Cl.$^7$ .................................................. F16L 33/22
(52) U.S. Cl. ...................................................... 24/20 R
(58) Field of Search ............................ 24/20 R, 20 LW, 24/20 TT, 20 EE, 23 W, 20 W, 23 EE, 23 R, 19

(56) References Cited

U.S. PATENT DOCUMENTS

| | | | |
|---|---|---|---|
| 4,299,012 A | * | 11/1981 | Oetiker |
| 4,724,583 A | * | 2/1988 | Ojima |
| 4,803,758 A | * | 2/1989 | Calmettes |
| 5,533,235 A | * | 7/1996 | Fukuda |

* cited by examiner

*Primary Examiner*—James R. Brittain
(74) *Attorney, Agent, or Firm*—Paul M. Craig, Jr.

(57) ABSTRACT

A method for manufacturing an open-type clamp and clamps made by such a method with an arrangement assuring gap-free and stepless internal clamping surfaces which include one of a female and male configuration at the end of the inner clamping band portion and one of male and female configuration in the outer clamping band potion, wherein the profile in the outer band portion is constituted by a deep-drawn channel having a dimension in the direction at right angle to the surface of the clamping band which corresponds substantially to the thickness of the clamping band, and merging any part of the outer clamping band remaining positionally substantially unaffected by the deep-drawing operation of the channel, into the inwardly displaced plane obtained by such deep-drawing operation.

28 Claims, 6 Drawing Sheets

METHOD OF MAKING HOSE CLAMPS WITH INTERNAL CLAMPING SURFACES DEVOID OF STEPS OR GAPS AND PRODUCTS MADE BY SUCH METHOD

This application discloses and claims subject matter disclosed in my then-pending Provisional Application Serial No. 60/266,849, filed on Feb. 7, 2001, for "Hose Clamp With Internal Clamping Surfaces Devoid of Steps or Gaps," now abandoned, and I hereby claim the priority of said provisional application.

FIELD OF THE INVENTION

The present invention relates to a method of making hose clamps of the so-called open type in which the internal clamping surfaces are devoid of any gaps or steps and to clamps produced by this method.

BACKGROUND OF THE INVENTION

With the availability of relatively hard and thin plastic hose materials, the step formed at the end of the inner clamping band portion became an ever more likely leakage problem. Additionally, with a tightening device forming a gap under the same, for example, with a so-called "Oetiker" ear, it became important to bridge the gap underneath the tightening device by the full band width of the inner clamping band portion to avoid a leakage problem. The need for higher tightening forces as well as the desirability of utilizing thin clamping band materials for cost reasons contributed to the need for an internal clamping surface devoid of any gap or step.

The arrangement of a stepless and gap-free internal clamping surface as disclosed in U.S. Pat. No. 4,299,012 to Oetiker provided a practical solution that enjoyed extraordinary commercial success by its use in hundreds of millions of clamps. According to this patent, a tongue-like extension at the end of the inner clamping band portion is adapted to extend through an opening provided in a step-like part of the outer band portion, whereby the step-like part has a height substantially corresponding to the thickness of the clamping band. As explained in my co-pending application Ser. No. 09/689,625, filed on Nov. 13, 2000, now U.S. Pat. No. 6,240,603, substantially all tensional forces are absorbed in such clamps in the outer clamping band portion including the area of the step-like part while the overlapped inner clamping band portion is substantially free of any tensional forces but serves to produce the radial clamping forces in the area of overlap. These clamping forces are produced by a reduction in the diametric dimension of the clamp by the tightening of the outer clamping band portion by means of the tightening device. Thus, within the area of overlap between the outer band portion and the tongue-like extension, the direct clamping action on the surface of the object to be tightened is produced in clamps of the type described in the prior U.S. Pat. No. 4,299,012 by the tongue-like extension alone. It is therefore desirable, on the one hand, to make the tongue-like extension as wide as possible in the transverse direction of the clamping band. On the other hand, to be able to absorb high tensional forces, it is desirable to make the lateral band portions in the step-like part delimiting the opening for the tongue-like extension on both sides thereof as wide as possible. A compromise to accommodate these contradictory requirements thus places some limitations on a designer's freedom in the design of such a clamp, not only as regards physical dimensions in the clamping band, but also as regards clamping band material.

A different approach utilizing a tongue-like extension adapted to engage in the opening formed by a fork-like configuration was disclosed in U.S. Pat. No. 4,237,584 to Oetiker. The concept for a stepless arrangement with a fork-like configuration was then adopted in U.S. Pat. No. 4,750,242 to Calmettes et al. in which a U-shaped configuration at the end of the inner clamping band portion is adapted to engage with a so-called boss of a shape complementary to the U-shaped configuration. However, the clamp as disclosed in this last-mentioned patent involves a potential leakage problem. Apart from the fact that the clamp according to this last-mentioned patent is a fixed-size clamp and provides no suggestion of how the arrangement thereof can be used in a clamp with a tolerance range in the diametric dimension, there is no indication in this patent on how to optimize the length of the blank necessary for a clamp embodying the disclosed arrangement.

SUMMARY OF THE INVENTION

Accordingly, it is a primary object of the present invention to provide a method for making open-type clamps which avoids the aforementioned shortcomings and drawbacks and permits a problem-free manufacture of open hose clamps, especially clamps that include a fork-like female profile at the end of the inner clamping band portion adapted to engage with a deep-drawn channel forming a male profile in the outer clamping band portion, whereby the male profile has an external shape in width and depth complementary to the opening in said female profile. The clamp made according to the manufacturing method of the present invention obviates the potential leakage problem of the prior art U.S. Pat. No. 4,750,242 by causing the lateral band parts remaining on both sides of the channel-shaped depression or indentation to merge with the bottom surface of the depression or indentation. The bottom surface of the depression or indentation is thereby at the same radial distance as the internal clamping surfaces of the entire clamp including also the inner clamping surfaces of the inner clamping band portion and of the remainder of the clamping ring and thereby assures a leakage-free arrangement.

However, the present invention is not limited in its application to clamps of the type illustrated in U.S. Pat. No. 4,750,242. Instead, the method of this invention involving a deep-drawn channel configuration can also be applied successfully in the manufacture of clamps of the type disclosed in the prior U.S. Pat. No. 4,299,012 and 4,237,584 with the surprising result that the aforementioned compromise problem can be dealt with more realistically by avoiding the opening in the step-like portion for the tongue-like extension.

Additionally, the present invention provides a disclosure as to the requirements of a clamp of the types mentioned above capable of producing stepless and gap-free clamping forces of the clamp over its entire tolerance range and additionally sets forth the parameters for the particular arrangement of the various parts in the clamping band to optimize clamping band requirements insofar as length of the blank is concerned.

BRIEF DESCRIPTION OF THE DRAWINGS

These and further objects, features and advantages of the present invention will become more apparent from the following description when taken in conjunction with the accompanying drawing which shows, for purposes of illustration only, several embodiments in accordance with the present invention, and wherein:

FIG. 8 is a somewhat schematic cross-sectional view taken along line VIII—VIII of FIG. 3a;

FIG. 9 is a somewhat schematic cross-sectional view taken along line IX—IX of FIG. 3a;

FIG. 10 is a somewhat schematic cross-sectional view taken along line X—X of FIG. 3a;

FIG. 11 is a somewhat schematic cross-sectional view taken along line XI—XI of FIG. 3a;

DETAILED DESCRIPTION OF THE DRAWINGS

Figure 1:
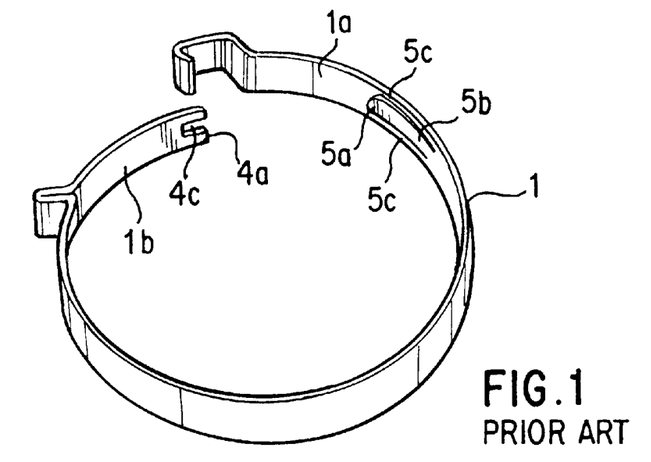
FIG. 1 is a perspective view of the clamp disclosed in U.S. Pat. No. 4,750,242.
Figure 2:
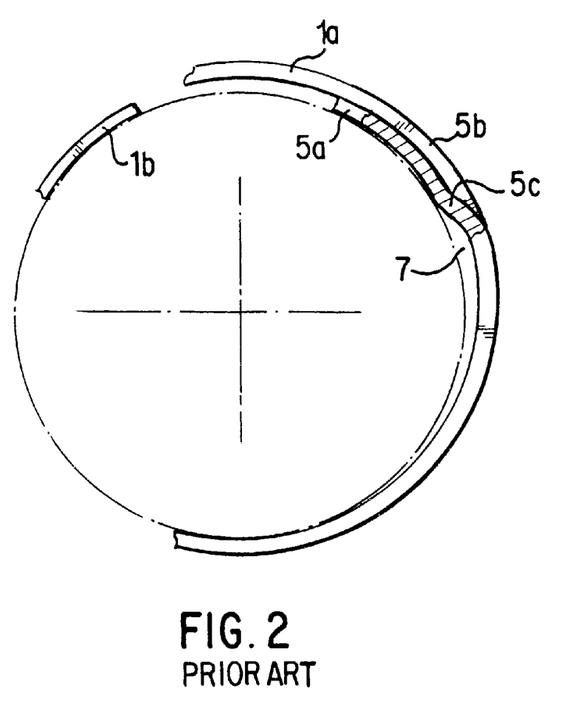
FIG. 2 is a somewhat schematic view on an enlarged scale and explaining the potential leakage problem with the clamp according to FIG. 1.

Referring now to the drawing wherein like reference numerals are used throughout the various views to designate like parts, FIG. 1 illustrates a clamp of the prior art as disclosed in U.S. Pat. No. 4,750,242. The clamp includes a clamping band 1 with an outer clamping band portion 1a and an inner clamping band portion 1b which is provided at the end thereof with a U-shaped opening 4a defining a substantially U-shaped female profile 4c. The outer band portion 1a is provided with a so-called boss 5a which, as disclosed in this patent, merges with its part 5b in the lateral band portions 5c of the outer clamping band portion 1a. According to this patent, and as clearly shown in FIG. 6 of this patent, the bottom of the boss 5a is merged by way of part 5b thereof in an outward direction with the lateral band parts 5c that remain at a radial distance corresponding to that of the outer clamping band portion 1a. As schematically shown in FIG. 2 of this application, a pocket-like arrangement 7 is formed thereby which represents a potential leakage place.

Figure 3:
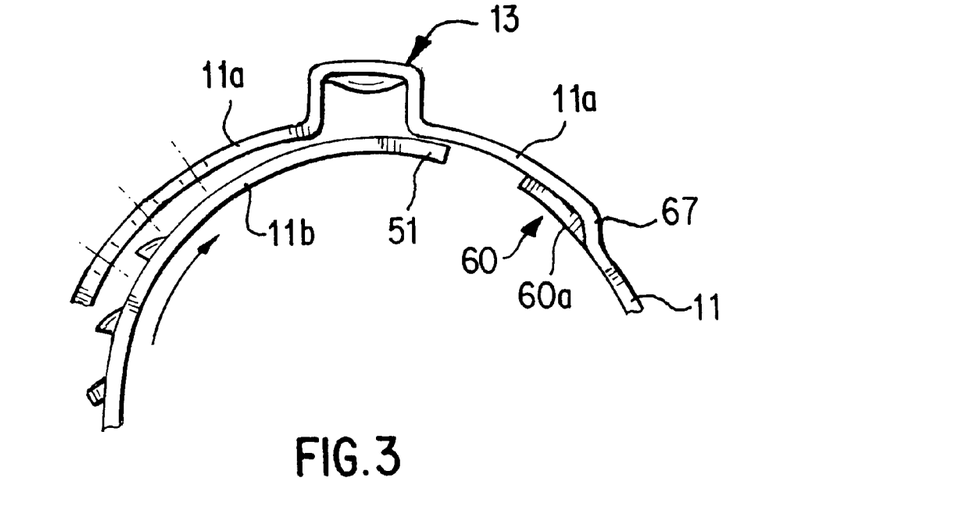
FIG. 3 is a somewhat schematic partial axial elevational view of a clamp made in accordance with the method of the present invention in which the mechanical connection is only schematically indicated and the clamp is in the not-yet-tightened condition of the tightening device.
Figure 3A:
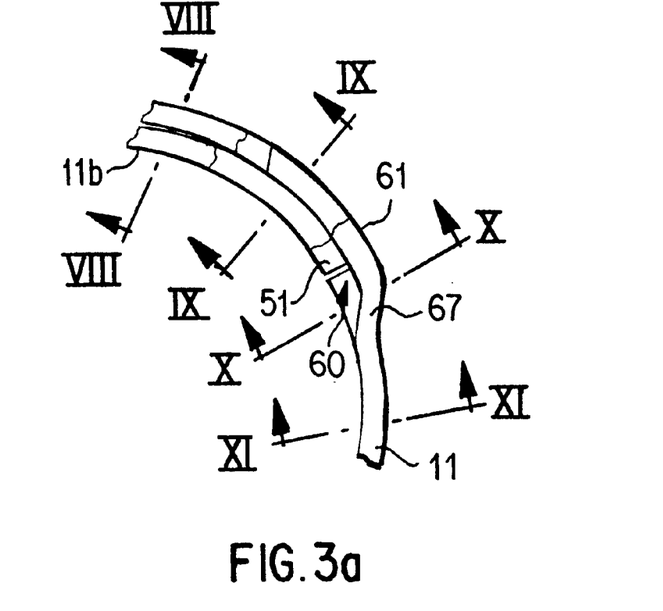
FIG. 3a is a somewhat schematic partial axial view of a clamp made in accordance with the method of the present invention, similar to FIG. 3, but partly in cross section and with the parts thereof, after tightening, in a position corresponding to the minimum diametric dimension of a given tolerance range of the clamp.
Figure 4:
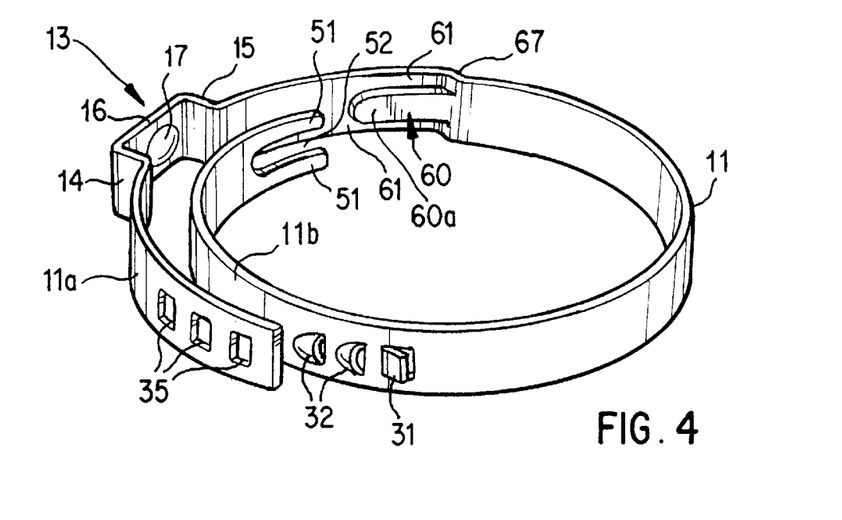
FIG. 4 is a somewhat schematic perspective view of a clamp according to this invention, similar in some respects to the clamp of U.S. Pat. No. 4,299,012, but incorporating a modified arrangement to achieve an internal clamping surface devoid of any gap or step and made in accordance with the method of the present invention.

According to the present invention, as shown in FIGS. 3 and 3a, this problem is avoided by the method according to this invention of manufacturing such a clamp in which the lateral parts 61 of the outer clamping band portion 11a which remain substantially unaffected by the deep-drawing operation on both sides of the deep-drawn channel forming an indentation or depression with a depth substantially equal to the thickness of the clamping band and generally designated by reference numeral 60, merge by way of the merging sections 67 with the bottom surface 60a of the channel-shaped indentation or depression 60. The bottom surface 60a is thereby at the normally existing radial distance of the clamping surface of the inner band portion 11b and therewith also of the clamping surface of the ring 11 of the clamp formed by the continuation of the outer band portion 11a. Depending on the thickness of the clamping band and deformability of the clamping band material, these merging sections 67 may be more or less steep but preferably gradual. The inner band portion 11b terminates at its free end in a pocket which is of substantially U-shaped configuration and is formed by the two fork tines 51 defining a female profile 52 (FIG. 4). The modification realized by the method according to this invention eliminates the pocket 7 of the prior art embodiment of FIGS. 1 and 2 and with it the potential leakage problem. It is also noted that as a general guideline, the merging sections 67 should not be too long in order to regain as quickly as possible the full band width of the outer band portion when the merging sections 67 reach the level of the bottom 60a of the channel-shaped depression or indentation 60. The length of the merging sections 67 in the longitudinal direction of the clamping band may be dictated, however, by manufacturing limitations. Optimum conditions can thereby be readily determined empirically for a given clamp size, for a given thickness of clamping band and for a given type of clamping band material.

Thus, the novel method according to this invention includes, in addition to possibly other deep-drawing operations determined by the details of the clamp, the steps of (a) forming by deep-drawing in the originally flat blank of the clamping band in what is to become the outer band portion, a channel defined by two side parts extending at substantially right angle to the surface of the clamping band. The channel is open at one end and closed at the other and has a dimension in a direction at right angle to the surface of the clamping band corresponding substantially to the thickness of the clamping band, preferably as close to the thickness dimension as possible. The channel which is located substantially symmetrically with respect to the center longitudinal plane of the clamping band has a dimension in the transverse direction of the clamping band which is no more than about 65% of the full width of the clamping band so that two lateral band portions exist at the open end of the channel, each extending away from a respective side part, and (b) merging, preferably during the deep-drawing operation, any part of the outer clamping band remaining positionally unaffected by the deep-drawing operation, into the new plane displaced by a distance substantially corresponding to the thickness of the clamping band so that the continuation of the outer clamping band portion now extends again uninterruptedly over the entire band width thereof in the new plane, and a gap-free and stepless internal clamping surface can be obtained.

The steps (a) and (b) may be performed with the use of a two-partite male die of complementary configuration sequentially movable in proper timed relationship relative to one another as known to those skilled in the art but are preferably performed simultaneously by a suitably constructed integral die to minimize stiffening to bending as a result of the deep-drawing deformations.

The application of the method of this invention to a clamp of the type illustrated in FIGS. 1 and 2 involves the formation of a channel 60 closed at the bottom and open at the top which is obtained by deep-drawing the center area of the clamping band to thereby form the channel in the shape of an indentation or depression and merging, preferably during the by deep-drawing operation, within the intended end area of the channel 60 away from the free end of the outer clamping band portion, the two lateral sections 67 remaining positionally unaffected by the deep-drawing of channel 60, into the plane of the displaced bottom 60a of the closed channel so that a full width internal clamping surface is achieved in the continuation 11 of he outer clamping band portion corresponding substantially to the clamping surface of the inner clamping band portion within the area of the U-shaped end portion 51. As mentioned before, for optimum performance, the depth of the channel 60 should correspond as closely as possible to the thickness of the clamping band to avoid any step whose possibly undesirable consequences depend thereby on the type and the thickness of the hose as well as on the type of the hose material and on the type of the clamping band material and thickness thereof.

FIG. 4 illustrates the application of this invention to a clamp with a so-called "Oetiker" ear as disclosed in U.S. Pat. No. 4,299,012 and with an arrangement to provide a stepless clamping surface obtained by the method according to the present invention. The clamp of FIG. 4 includes a clamping band 11 with overlapping outer and inner clamping band portions 11a and 11b, a tightening device in the form of a plastically deformable ear generally designated by reference numeral 13 consisting of outwardly extending leg portions 14 and 15 interconnected by a bridging portion 16 preferably provided with a reinforcement 17 of any type as known heretofore, and a mechanical connection consisting of a guide hook 31 and of two deep-drawn support hooks 32 extending outwardly from the inner clamping band portion 11b and adapted to engage in openings 35 in the outer clamping band portion 11a. To achieve an inner clamping band surface devoid of gaps or steps, the clamp of FIG. 4 is provided with a deep-drawn channel 60 forming a male profile in the outer clamping band portion 11b, with a U-shaped inner clamping band end 51 forming a female profile and with merging section 67 as described in connection with FIGS. 3 and 3a.

Moreover, the present invention is not limited to clamps with the mechanical connection 31, 32, 35 shown in FIG. 4 but is also applicable to clamps having a different connection between overlapping band portions as known to those skilled in the art, for example, as shown in U.S. Pat. No. 3,286,314 or in U.S. Pat. No. 4,711,001. A welded connection, especially spot-welded or laser-beam-welded connection, is also feasible. However, spot-welding should be avoided with galvanized steel because of possible damage to the protective coating in galvanized steel and therefore is preferably used only with stainless steel band material.

Figure 5:
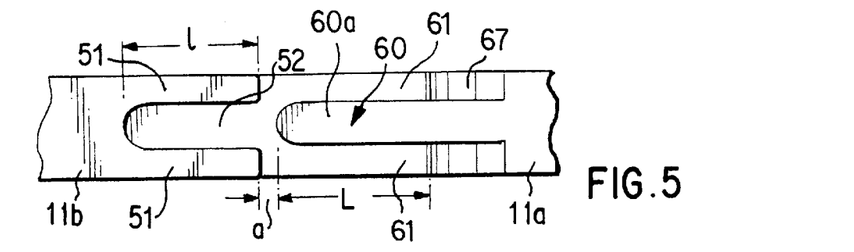
FIG. 5 is a somewhat schematic partial plan view on the clamp made in accordance with the method of the present invention, as viewed from the inside thereof and developed in the plane of the drawing for better understanding, which illustrates the position of the various parts of the clamp in accordance with the present invention with the mechanical connection engaged but in the non-tightened condition thereof.

Optimization of the length of the clamping band in a clamp of the type shown in FIGS. 3, 3a and 4 can be realized by adopting the following teachings. Turning to FIG. 5, the length l of the fork-shaped female profile 52 corresponds at most to the length L of the channel-shaped indentation or depression 60 up to the point where the merging sections 67 start, but is preferably slightly smaller than the distance L to assure unimpaired realization of the minimum radial dimension in the tolerance range of the clamp. The width of the female profile 52 formed by the two fork tines 51 of the end of the inner clamping band portion 11b should be slightly wider than the width of the channel-shaped indentation or depression 60 to permit mutual sliding engagement. In the position of a clamp illustrated in FIG. 5, which corresponds to the not-yet-tightened condition of a clamp but with the mechanical connection already engaged, leakage would occur as long as a spacing a exists between the end of the pocket 52 at the end of the inner clamping band portion 11b and the beginning of the channel-shaped depression or indentation 60 because no clamping action would exist within this area.

Figure 6:
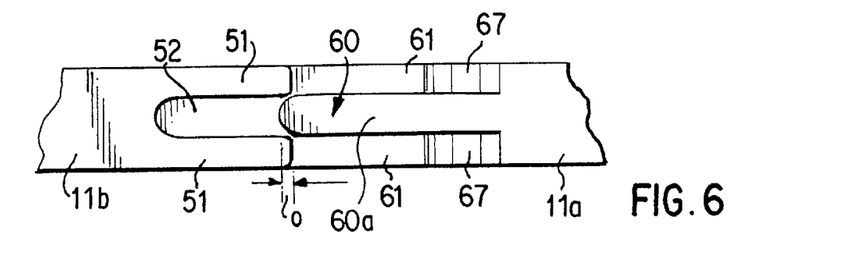
FIG. 6 is a somewhat schematic partial plan view similar to FIG. 5 and illustrating the position of the various parts of the clamp made in accordance with the method of the present invention in the tightened condition corresponding to maximum diametric dimension of the given tolerance range.
Figure 7:
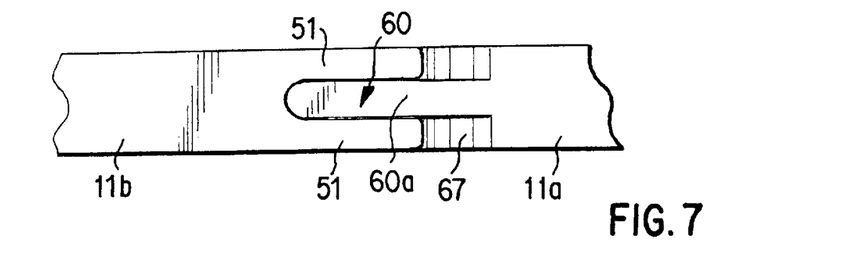
FIG. 7 is a somewhat schematic partial plan view similar to FIGS. 5 and 6 and illustrating the position of the various parts of the clamp made in accordance with the method of the present invention in the tightened condition corresponding to minimum diametric dimension of the given tolerance range.
Figure 8:
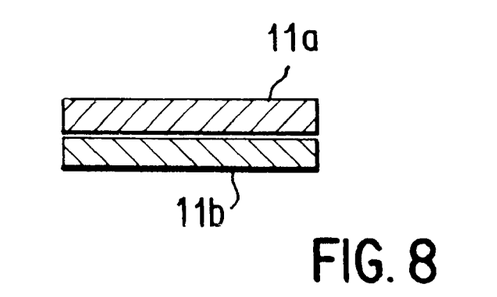
Figure 9:
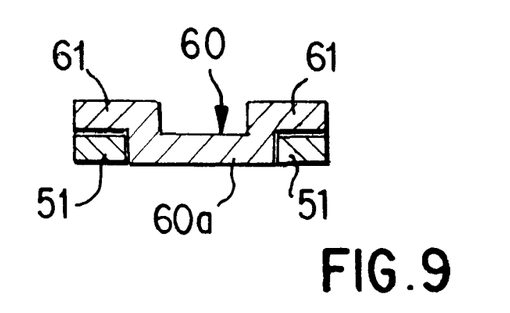
Figure 10:
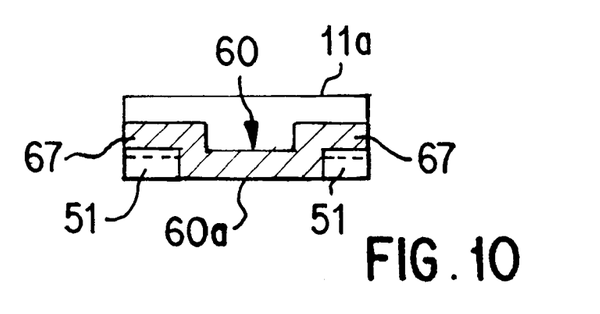
Figure 11:
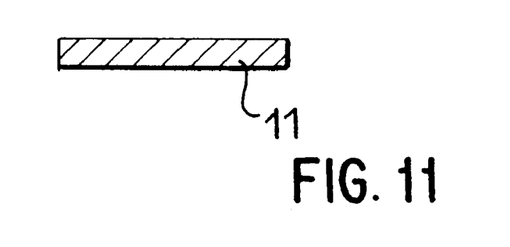

In a clamp having a clamping action for a given tolerance range, at least a small overlap only schematically shown in FIG. 6 and designated by reference character o should exist between the channel-shaped indentation or depression 60 and the fork tines 51 as shown in FIG. 6 to assure a clamping action without danger of leakage in the maximum diametric dimension of the given tolerance range of the clamp. The amount of overlap o necessary for a problem-free functioning of the clamp in the position of maximum diametric dimension depends on a number of factors and can be readily determined for a clamp of a given size with a given tolerance and made of a given band material with a specified thickness of the band material. FIG. 7 in turn illustrates the position of the various parts in the minimum diametric dimension of a given tolerance range of the clamp.

The location of the channel-shaped depression or indentation 60 in the clamping band does not by itself affect the total length of the blank necessary for a clamp embodying this invention which is controlled by other factors. Leaving aside any consideration of the length of the outer clamping band portion 11a from the leg portion 14 of the tightening device 13 to the mechanical connection 31, 32, 35 which depends on well known factors and which can be optimized to minimize the length of clamping band material in accordance with known practices, it becomes clear that the total length of a blank necessary for a clamp made in accordance with the method of this invention depends primarily on the length of the inner clamping band portion 11b, and more particularly on the length of necessary overlap to the right of leg portion 15, as viewed in FIG. 4. To assure proper operation of the clamp, the gap under the tightening device 13 must be bridged by the full band width of the inner band portion in all clamping portions of the clamp. In other words, the presence of any part of the fork tines 51 in the area of the gap under the tightening device is to be avoided in such condition. As a precaution, the inner band portion is therefore long enough so that the beginning of the female profile formed by the fork tines 51 comes to lie under the full band width of the outer band portion to the right of leg portion 15 when the mechanical connection 31, 32, 35 is engaged and before tightening of the clamp occurs. In fact, as a precautionary measure, it is deemed desirable in that condition that the beginning of the female profile start a small distance to the right of the connection of the leg portion 15 with the outer clamping band portion. The length of the necessary blank is therefore controlled by the length l (FIG. 5) of the female profile and the gap a between male and female profiles when the connecting means is engaged but the tightening device is not yet tightened as well as by the location of the channel-shaped depression 60 in the outer clamping band. The length L of the channel-shaped depression or indentation 60 should be equal to at least the tolerance range of the clamp plus the distance o of the overlap in the maximum diametric dimension of the tolerance range of the clamp. The length l of the pocket 50 must therefore be nearly the same as the length L, preferably a small amount shorter to assure reliable realization of the minimum diametric dimension of the tolerance range of the clamp.

In the absence of gap formed by the non-overlapping distance a (FIG. 5) the dimensions L and l would have to be increased to achieve a gap-free given tolerance range which would necessarily increase the required length of the inner band portion. Additionally, it would locate the beginning of the channel-shaped depression or indentation 60 closer to the leg portion 15. The permitted distance a depends on the tightening range of the clamp from the condition when the mechanical connection is engaged and the tightening device is not yet tightened and the point when tightening reaches the maximum dimension in the clamp's tolerance range for which the clamp is designed to realize reliable gap-free clamping action at the point of the maximum tolerance when no gap a can be allowed. The actual location of the channel-shaped depression or indentation 60 depends on the type and thickness of clamping band material as well as on the size of the clamp and its optimum location can be determined empirically. As a general rule it must be located so far from the connection of the leg portion 15 with the outer clamping band portion 11a that no adverse interaction occurs in the manufacture of the clamp by the use of the channel-shaped depression or indentation 60. The optimum length for a blank necessary to realize a clamp made by the method of this invention, i.e., the location of the channel-shaped depression or indentation 60 in the outer clamping band portion and the total length of the overlapped inner clamping band portion 11b can be readily determined by taking into consideration the foregoing criteria including the need for bridging the gap underneath the tightening device by the full band width of the inner band portion 11b, i.e., by an inner band portion without any female profile.

FIGS. 8, 9, 10 and 11 are somewhat schematic cross-sectional views of the position of the various parts of a clamp of the type illustrated in FIG. 3a.

The width of the channel 60, on the one hand, and of the lateral parts 61 (FIGS. 4 and 9) remaining positionally unaffected by deep-drawing of the channel 60 should be chosen by taking into consideration the following. The width of the lateral parts 61 and of the fork tines 51 should be fairly wide because the clamping pressure is produced at the end of the inner band potion 11b by the fork tines which are pressed radially inwardly by the overlapping lateral parts 61. Additionally, the lateral parts 61 and merging sections 67 should be wide enough to absorb the tensional forces for which the clamp is designed without tearing or rupturing. On the other hand, over a substantial part of the tolerance range of the clamp, the clamping action is produced by the internal clamping surface 60a of the channel 60 which makes it desirable to make the channel as wide as possible. Furthermore, to facilitate the inward merging deformation of the sections 67, the latter are preferably narrow. Thus, the actual values assigned to these dimensions depend on the type of the clamp, the clamping band material and its thickness as well as the tensional and clamping forces expected in a given clamp and can be optimized empirically by adopting the aforementioned teachings. As a general guideline, the width of the clamping surface 60a of the channel 60 may be from about 35% to about 65% of the width of the clamping band while the width of each fork tine 51 may be from about 32.5% to about 17.5% of the width of the clamping band; preferably the width of the clamping surface 60a of the depression 60 is from about 40% to about 60% and the width of each fork tine 51 is from about 30% to about 20% of the width of the clamping band.

Figure 12:
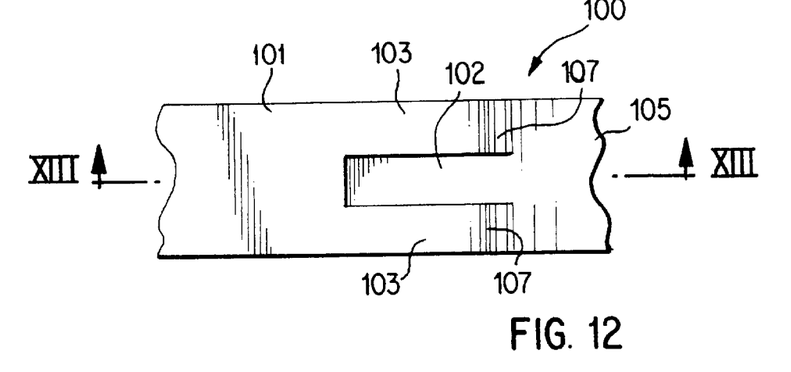
FIG. 12 is a plan view on a portion of a female die for use in the method of this invention to manufacture the clamp of FIGS. 3–11.
Figure 13:
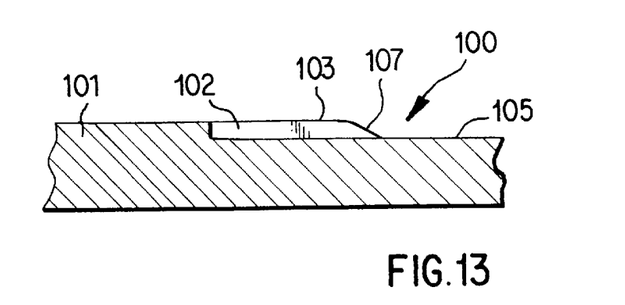
FIG. 13 is a longitudinal cross-sectional view taken along line XIII—XIII of FIG. 12.

FIGS. 12 and 13 illustrate a portion of a female die generally designated by reference numeral 100 which includes a flat portion 101 extending the full width of the clamping band on which is to be supported the part of the blank intended to form the outer band portion 11a . The die 100 includes a cavity 102 having a dimension such that the channel-shaped depression or indentation 60 with the aforementioned dimensions is realized by deep-drawing. The cavity 102 leaves on both sides thereof flat lateral surfaces 103 at the level of the flat portion 101. The cavity 102 terminates in a flat portion 105 extending over the entire width of the clamping band and displaced with respect to the surface of portion 101 by a distance substantially corresponding to the thickness of the clamping band whereby the lateral surfaces 103 of the female die merge by way of merging sections 107 with the flat portion 105. The merging sections 107 are designed, bearing in mind what was said with respect to the merging sections 67 and that sharp corners should be avoided in cold-deformed and/or deep-drawn sheet metal parts. The male die member (not shown) is of complementary configuration to that of the female part, as known in the art, whereby the flat part 105 is displaced with respect to the flat portion 101 by such an amount that the outer band portion 11a is displaced by an amount corresponding substantially to the thickness of the clamping band. Though shown in the plane of the drawing, the die 100 may also have a curved configuration as is known in the manufacture of clamps. The other parts of the clamp, such as tightening device and mechanical connection, are made by conventional means as known in the prior art. For example, the U-shaped female profile 50, the openings 35 and the cuts necessary to enable deformation of the hook-like members 31, 32 can be realized in the same operation as cutting the blank from the supply of band material. Deformation of a tightening device and of the hook-like members can be realized in the same step as realizing the channel 60 or in a separate step or steps, depending, for instance, on the type of tightening device.

Figure 14:
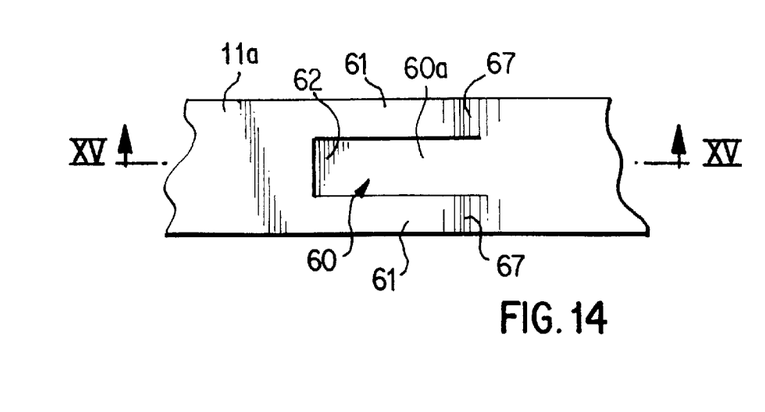
FIG. 14 is a top plan view on a part of the outer band portion obtained with the die of FIGS. 12 and 13.
Figure 15:
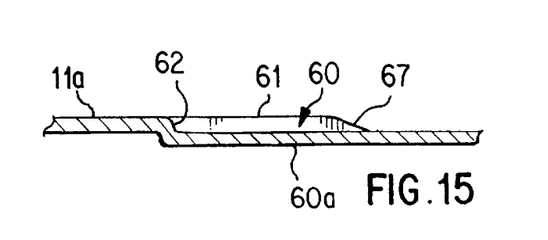
FIG. 15 is a cross-sectional view taken along line XV—XV of FIG. 14.

FIGS. 14 and 15 show a part of the outer clamping band portion obtained with a die of the type illustrated in FIGS. 12 and 13.

However, the present invention is not limited to clamps of the type shown in FIGS. 1–4 but is applicable equally to other types of clamps that involve overlapping band portions. For example, the method according to this invention is equally applicable to clamps with an arrangement of a tongue-like extension at the inner clamping band end as shown in U.S. Pat. No. 4,299,012 and 4,237,584 as well as to so-called screw-type clamps as disclosed in FIG. 40 of the U.S. Pat. No. 4,299,012 or in U.S. Pat. No. 4,521,940.

Figure 16:
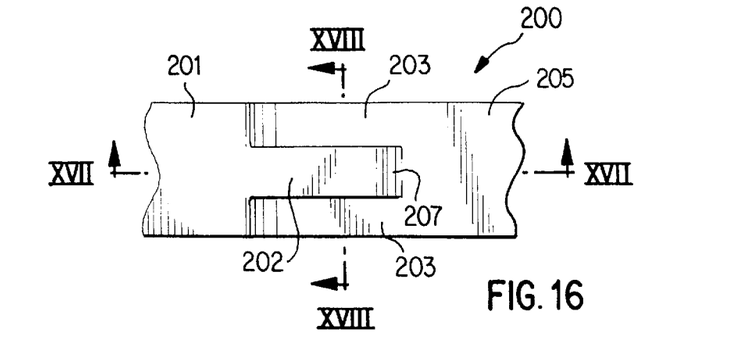
FIG. 16 is a top plan view on a portion of a modified embodiment of a female die for the method of manufacture according to this invention of a clamp having a different arrangement to achieve an internal clamping surface devoid of any gap or step.
Figure 17:
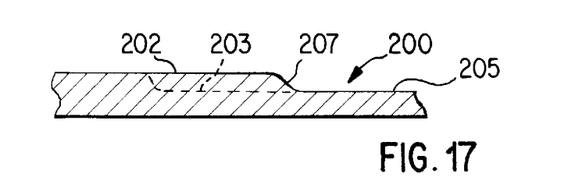
FIG. 17 is a partial longitudinal cross-sectional view taken along line XVII—XVII of FIG. 16.
Figure 18:
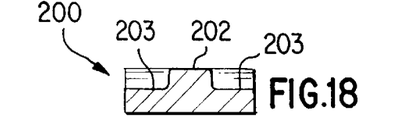
FIG. 18 is a cross-sectional view taken along line XVIII—XVIII of FIG. 16.
Figure 19:
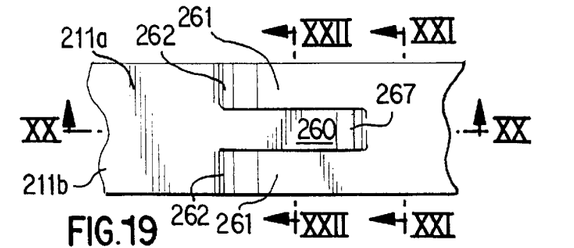
FIG. 19 is a partial somewhat schematic top plan view on the outer band portion of a clamp obtained with the die of FIGS. 16, 17 and 18.
Figure 20:
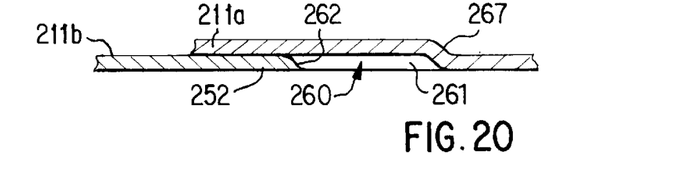
FIG. 20 is a partial somewhat schematic longitudinal cross-sectional view taken along line XX–XX of FIG. 19.
Figure 21:
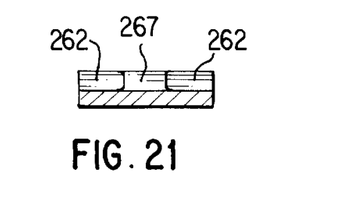
FIG. 21 is a somewhat schematic transverse cross-sectional view taken along line XXI—XXI of FIG. 19.
Figure 22:
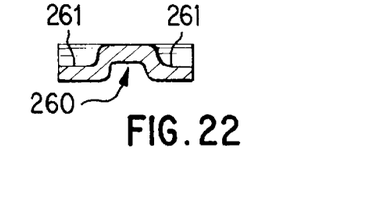
FIG. 22 is a somewhat schematic transverse cross-sectional view taken along line XXII—XXII of FIG. 19.

FIGS. 16 through 18 illustrate somewhat schematically a part of a female die for use with a method according to this invention to manufacture a clamp as disclosed in U.S. Pat. No. 4,299,012. More particularly, the die generally designated by reference numeral 200 in FIGS. 16 through 18 includes a flat portion 201 extending over the entire width which is followed in a direction away from the free end of the outer band portion by two lateral parts 203 displaced with respect to the plane of the part 201 by a dimension substantially corresponding to the thickness of the clamping band. The center area 202 of the die remains in the plane of the clamping band part 201 so that a channel is formed by deep-drawing which is closed at the top and open at the bottom. The center part 202 is then gradually merged into the plane of the displaced lateral parts 203 of the die within the area of 207 so that a surface 205 displaced by a distance substantially corresponding to the thickness of the clamping band and extending uninterruptedly over the full width of the clamping band exists again in the continuation of the outer band portion behind the merging section 207.

What was said above in connection with the female die of FIGS. 12 through 15 is equally applicable to the die of FIGS. 16 through 18.

FIGS. 19 through 22 illustrate somewhat schematically a part of the outer clamping band portion of a clamp made by the method according to this invention in which reference numerals of the 200 series which correspond to the reference numerals of FIGS. 15 and 16 are used. The inner band portion 211b terminates in a tongue-like extension 252 as disclosed in U.S. Pat. No. 4,299,012 which is adapted to engage into the channel 260 closed at the top whereby the width of the tongue-like extension 252 is slightly smaller than the width of the channel 260 but preferably as close to the width as acceptable for easy sliding movement in the channel to maximize the area of clamping surface offered by the tongue-like extension ahead of the lateral parts 261 formed during deep-drawing of the channel 260. The same is true insofar as the merging section 267 into the plane of the lateral parts 261 is concerned.

What was said in connection with the embodiment of FIGS. 4 through 14 to optimize the length of the blank, i.e., of the length of clamping band needed for the blank, it is only necessary to recall that at least a slight overlap must exist between the lateral band portions 261 and the tongue-like extension 252 when the clamp is in its position of maximum diametric dimension for the given tolerance range of a nominal clamp size. The length of the channel as also the length of the tongue-like extension 252 must thereby be sufficient to accommodate the full contraction of the "Oetiker" ear, i.e., when the plastically deformed ear reaches its maximum plastic deformation which should correspond substantially to the minimum diametric dimension of the given tolerance range of the nominal clamp size. On the other hand, the tongue-like extension must not reach a position beyond the merging section 267 when the clamp is in its minimum diametric position of the given tolerance range. As to the rest, what was said in connection with the embodiment of FIGS. 4 through 15 applies also to the embodiment of FIGS. 16 through 21, especially insofar as the sections 262 and 267 are concerned.

The male die to be used with the method of this invention is thereby complementary to the female die as disclosed herein, as known to any person skilled in the art. Furthermore, as is also known in the art of deep-drawing and cold-deforming this type of product, sharp angles are to be avoided to avoid unnecessary stresses which can be readily realized by forming curved surfaces with small radii of curvature where desired. Additionally, as mentioned before, during the cold-deforming and deep-drawing operation in accordance with this invention, other deep-drawing and cold-deformation operations of the clamping band may also take place by the use of suitably constructed dies. Furthermore, any tendency on the part of the clamping band to develop an increase in local stiffening and local resistance to bending can be counteracted by conventional means known in the art, for instance as disclosed in U.S. Pat. No. 4,299,012, which suggests weakening short cuts or cut-outs.

While I have shown and described only two embodiments in accordance with the present invention, it is understood that the same is not limited thereto but is susceptible of numerous changes and modifications as known to those skilled in the art. I therefore do not wish to be limited to the details shown and described herein but intend to cover all such changes and modifications as are encompassed by the scope of the appended claims.

What is claimed is:

1. A method for manufacturing a clamp having a stepless and gap-free internal clamping surface obtained by the use of one of a female and male profile, respectively, at one end of the clamping band intended to form an overlapped inner band portion in the installed condition of the clamp and by one of a male and female profile, respectively, formed by a channel in the clamping band intended to form an overlapping outer band portion in the installed condition of the clamp, comprising the steps of a) deforming by deep-drawing the clamping band to realize in the center area of the clamping band the channel which has a dimension in the direction at right angle to the plane of the clamping band substantially corresponding to the thickness of the clamping band and which is open at one end and closed at the other, and b) merging within the area of the intended end of the channel away from the free end of the outer clamping band portion, any part of the clamping band remaining positionally substantially unaffected by the formation of the channel in such a manner that a surface of the continuation of the outer clamping band portion is achieved terminating in a single plane displaced with respect to the original plane of the outer clamping band portion by a distance substantially corresponding to the thickness of the clamping band and extending uninterruptedly over the entire band width of the clamping band.

2. A method according to claim 1, wherein steps (a) and (b) take place substantially simultaneously.

3. A method according to claim 1, wherein steps (a) and (b) take place during the deep-drawing operation.

4. A method according to claim 1, wherein the channel formed by step (a) is in the form of an indentation in the center area of the clamping band leaving side parts on both sides of the channel substantially unaffected by the formation of the channel which are merged into the plane of the channel bottom.

5. A method according to claim 1, wherein the channel formed by step (a) is closed at the bottom and open at the top.

6. A method according to claim 1, wherein the channel formed by step (a) is closed at the top and open at the bottom.

7. A method according to claim 6, wherein the closed top of the channel is merged with lateral parts of the clamping band displaced by the deep-drawing operation to form a continuation of the outer clamping band displaced by a distance corresponding substantially to the displacement of the lateral parts so as to form a continuation of the outer clamping band displaced by a distance substantially corresponding to the thickness of the clamping band and extending over the entire width of the clamping band.

8. A clamp made by the method of claim 1.

9. A clamp made according to the method of claim 5.

10. A clamp made according to the method of claim 6.

11. An open-type clamp, comprising a clamping band having clamping band end portions intended to form overlapping inner and outer band portions in the installed condition, connecting means operable to connect overlapping band portions, a tightening device for tightening the clamping band about an object to be fastened thereby, said tightening device forming a gap in the circumferential direction of the clamping band, and further means assuring gap-free and stepless internal clamping surfaces of the clamping band means including one of a female and male profile at the end of the inner clamping band portion, one of a male and female profile in the outer clamping band portion formed by a deep-drawn channel having a dimension at right angle to the surface of the clamping band substantially corresponding to the thickness of the clamping band, and any part of the outer band portion remaining positionally substantially unaffected by the deep-drawing merging within the area of the end of the channel away from the free end of the outer clamping band portion into the plane displaced by said distance in the formation of the channel.

12. A clamp according to claim 11, wherein said channel is open at the top and is defined by two side parts at substantially right angle to the surface of the clamping band which are connected by a connecting bottom part thereby leaving two lateral side parts in the original plane of the outer band portion which extend laterally from a respective side part, and wherein said lateral parts merge into the plane of the connecting part at said channel end.

13. A clamp according to claim 11, wherein said channel is closed at the top and is defined by two side parts at substantially right angle to the surface of the clamping band which are connected by a connecting part forming the top of the channel and constituted by a positionally substantially unaffected center area of the original outer clamping band portion, wherein two lateral parts displaced by said distance extend outwardly from the respective inner end of the side parts, and wherein the connecting part is merged into the plane of the lateral parts at the end of the channel away from the free end of the outer clamping band portion.

14. A clamp according to claim 11, wherein said connecting means and tightening device are mutually separate parts located in different places in the clamping band.

15. An open-type clamp, comprising a clamping band having clamping band end portions intended to form overlapping inner and outer band portions in the installed condition, connecting means operable to connect overlapping band portions, a tightening device for tightening the clamping band about an object to be fastened thereby, said tightening device forming a gap in the circumferential direction of the clamping band, and further means assuring gap-free and stepless internal clamping surfaces of the clamping band means including a female profile of substantially fork-like configuration at the end of the inner clamping band portion, a deep-drawn inwardly extending channel-like depression in the outer clamping band portion forming a male profile and having a depth substantially corresponding to the thickness of the clamping band so that in the installed condition of the clamp the inwardly facing surface of the channel-like depression, which forms the bottom thereof, is at substantially the same radial distance as the inner clamping surface of the inner clamping band portion, said inwardly extending channel-like depression forming a male profile substantially complementary to the female profile and leaving on both sides of the channel-like depression a remaining lateral part of the outer clamping band portion, and the end sections of said lateral parts merging inwardly in a direction away from the free end of the outer band potion from a predetermined point of said channel so as to become substantially coplanar with the inwardly facing bottom surface of the depression.

16. An open-type clamp, comprising a clamping band having clamping band end portions intended to form overlapping inner and outer band portions in the installed condition, connecting means operable to connect overlapping band portions, a tightening device for tightening the clamping band about an object to be fastened thereby, said tightening device forming a gap in the circumferential direction of the clamping band, and further means assuring gap-free and stepless internal clamping surfaces of the clamping band means including a male profile in the form of a tongue-like extension at the end of the inner clamping band portion, a female profile in the center area of the outer clamping band portion in the form of a deep-drawn channel closed at the top and open at the bottom, said deep-drawn channel having a dimension at right angle to the surface of the clamping band substantially corresponding to the thickness of the clamping band and forming two lateral deep-drawn parts extending outwardly from the bottom of said channel, so that in the installed condition of the clamp the inwardly facing surfaces of the lateral parts are at substantially the same radial distance as the inwardly facing surface of the inner clamping band portion, said male profile being substantially complementary to the female profile and said female profile being defined by two deep-drawn side parts extending at substantially right angle to the surface of the clamping band which are interconnected at the top by a connecting part formed by the center area of the original outer band portion, said two lateral parts which extend outwardly from a respective side part being displaced from the original plane of the outer clamping band portion by said distance, and the end section of the top of the channel merging inwardly in a direction away from the free end of the outer band portion from a predetermined point of said channel to become substantially coplanar with the inwardly facing surface of the lateral parts.

17. A clamp according to claim 11, wherein said tightening device includes two outwardly extending parts spaced from one another in the non-tightened condition and operable to be drawn toward one another to cause tightening of the clamp.

18. A clamp according to claim 17, wherein said tightening device is a screw-type tightening device causing tightening of the clamp by screw-type action which moves said two outwardly extending parts toward one another.

19. A clamp according to claim 17, wherein said tightening device is formed by a plastically deformable ear-like structure having two leg portions constituted by said two outwardly extending parts which are interconnected by a bridging portion.

20. A clamp according to claim 19, wherein said bridging portion includes reinforcing means.

21. A clamp according to claim 11, wherein said tightening device is operable to provide a range of diametric dimensions in the tightened condition of the clamp to compensate for tolerances.

22. A clamp according to claim 11, wherein the clamp has a nominal diametric dimension $d_n$, a maximum diametric dimension $d_{max}$ and a minimum diametric dimension $d_{min}$ for which the clamp is designed to clamp an object to be fastened thereby, and wherein the length of said male profile, the length of said female profile and the relative location thereof in the clamp is such that an overlap exists between said profiles under all tightening conditions from maximum diametric dimension to minimum diametric dimension.

23. A clamp according to claim 22, wherein said channel is so located in the outer clamping band portion that in the not-yet-tightened condition of the tightening device but with the connecting means engaged, the gap under the tightening device is substantially bridged by the full band width of the inner band portion, and wherein an overlap exists between said female profile and said male profile in the tightened condition of the clamp corresponding to said maximum diametric dimension.

24. A clamp according to claim 11, wherein said tightening device forms an inwardly open gap, wherein said clamp has a predetermined clamping range from a maximum diametric dimension to a minimum diametric dimension to compensate for tolerances, and wherein said channel is so located in the outer clamping band portion that a spacing exists between said male and female profiles when the connecting means are engaged but the tightening device is not yet tightened and that a slight overlap exists between profiles when the clamp is in the condition of maximum diametric clamping dimension to optimize the required length of a blank for the clamp.

25. A clamp according to claim 11, in which a lateral part extends away from said channel on each side thereof, and wherein said channel has a width of about 35% to about 65% of the width of the clamping band means while the width of each lateral part is about 32.5% to about 17.5% of the width of the clamping band means.

26. A clamp according to claim 11, in which a lateral part extends away from said channel on each side thereof, and wherein said channel has a width of about 40% to about 60% of the width of the clamping band means while the width of each lateral part is about 30% to about 20% of the width of the clamping band means.

27. A blank for a clamp with a clamping range from a minimum to a maximum diametric dimension according to claim 11, in which the length of the blank is such that said channel is so located in the outer clamping band portion that the gap underneath the tightening device is bridged by the full band width of the inner clamping band portion, a spacing exists between said male and female profiles when aid connecting means is engaged but the tightening device is not yet tightened, and that an overlap of between about 3% to about 10% of the tolerance range exists between said profiles when the clamp is in the condition of maximum diametric clamping dimension to optimize the required length of a blank for the clamp.

28. In a clamp in which a stepless and gap-free internal clamping surface is achieved by one of a substantially female and male profile at one end of the clamping band intended to form an overlapped inner band portion in the installed condition of the clamp and by one of a male and female profile formed by a channel in the clamping band intended to form an overlapping outer band portion in the installed condition of the clamp, a method for manufacturing the clamp, comprising the steps of (a) deforming by deep-drawing the center area of the outer band portion of the clamping band to realize the channel which is defined by side parts interconnected at one end and with lateral parts extending outwardly from said side parts at the other end of said channel, and (b) merging any part of the outer clamping band portion within the area of the channel positionally substantially unaffected by the deep-drawing of the channel in such a manner that any such positionally unaffected part terminates in a plane coinciding with the plane containing the surface of the outer band portion displaced by the deep-drawing of the channel.

* * * * *